United States Patent [19]

Almering et al.

[11] 3,803,490

[45] Apr. 9, 1974

[54] TRANSMISSION SYSTEM FOR STEREOPHONIC SIGNALS

[75] Inventors: Petrus Cornelis Maria Almering; Henri Jan Velo, both of Hilversum, Netherlands

[73] Assignee: U.S. Philips Corporation, New York, N.Y.

[22] Filed: Jan. 7, 1972

[21] Appl. No.: 216,066

[30] Foreign Application Priority Data

Jan. 29, 1971 Netherlands ........................ 7101184

[52] U.S. Cl. .................. 325/36, 325/49, 179/15 BT

[51] Int. Cl. .............................................. H04j 1/18

[58] Field of Search ............ 325/36, 60, 61, 63, 65, 325/50, 184; 179/15 BT, 15 BP; 331/1 R, 25; 343/200

[56] References Cited

UNITED STATES PATENTS 3,201,692 8/1965 Sichak ................................ 325/17

*Primary Examiner*—Benedict V. Safourek

*Attorney, Agent, or Firm*—Frank R. Trifari; Henry I. Steckler

[57] ABSTRACT

The invention relates to a transmission system for the transmission of two coherent stereophonic signals by means of single sideband modulation in which one of the signals is transmitted as an upper sideband signal and the other signal is transmitted as a lower sideband signal and in which the required single sideband modulators are controlled by carrier signals of unequal frequency. These carrier signals are derived in both the transmitter and the receiver through selection circuits from a carrier circuit controlled by a generator, which circuit is incorporated in an automatic phase correction loop (AFC-loop) provided with a phase detector and a modulator to which the output signals from the selection circuits are applied as modulating signals and to which a modulation signal derived from the carrier circuit is applied for generating an output signal having a frequency which is equal to that of the generator, which output signal is applied together with a control signal to the phase detector for generating a control signal controlling a frequency-determining member of the generator.

11 Claims, 4 Drawing Figures

TRANSMISSION SYSTEM FOR STEREOPHONIC SIGNALS

The invention relates to a transmission system for transmitting in a prescribed frequency two coherent signals, in particular, stereophonic signals, and comprising a transmitter and a receiver. In said transmitter said signals are applied to single sideband modulators each controlled by a carrier signal. Said carrier signals, having mutually unequal frequencies, are derived from selection circuits connected to a carrier signal circuit comprising a central generator. Single sideband signals constituted by different modulation sidebands are derived from said single sideband modulators and together with a pilot signal are transmitted to said receiver in which the received signals are applied to two parallel-arranged channels each including a single sideband demodulator, each controlled by a carrier signal, said carrier signals, having mutually unequal frequencies, are derived from selection circuits connected to a local carrier signal circuit comprising a local generator which is synchronised on the received pilot signal.

In such a transmission system it is to be ensured that in order to get an eminent transmission quality the two recovered coherent signals in the receiver are accurately equal in frequency while the phase difference between the two signals is accurately in conformity with the phase difference between the two coherent signals to be transmitted in the transmitter. Particularly when transmitting over large distances of, for example, more than 2,000 kms, special attention is to be paid to the construction of the carrier circuits because phase shifts in the generated carriers, for example, as a result of detuning of the selection circuits connected to the carrier circuits as a result of temperature fluctuations, ageing phenomena, frequency variations in the transmission path and the like introduce unwanted phase shifts in the stereophonic signals which phase shifts detrimentally influence the transmission quality of the transmission system.

It is an object of the present invention to considerably improve the transmission quality in a transmission system of the kind described in the preamble by considerably reducing unwanted phase shifts in the stereophonic signals as a result of phase shifts in the generated carrier signals.

To this end the invention is characterized in that both in the transmitter and the receiver the carrier signal circuits together with the generators and the selection circuits connected to said carrier signal circuit form part of an automatic phase correction loop (AFC-loop) which furthermore comprises a phase detector and a modulation device the carrier signals derived from the selection circuits and a modulation signal derived from the carrier signal circuit are applied to said modulation device to produce an output signal having a frequency which is equal to the generator frequency, said output signal and a control signal are applied to said phase detector to produce a control signal which through a low-pass filter is applied to a frequency-determining member of said generator so as to automatically correct its frequency.

In order that the invention may be readily carried into effect, some embodiments thereof will now be described in detail by way of example, with reference to the accompanying diagrammatic drawings in which:

FIG. 2 shows a receiver according to the invention while

Figure 1:
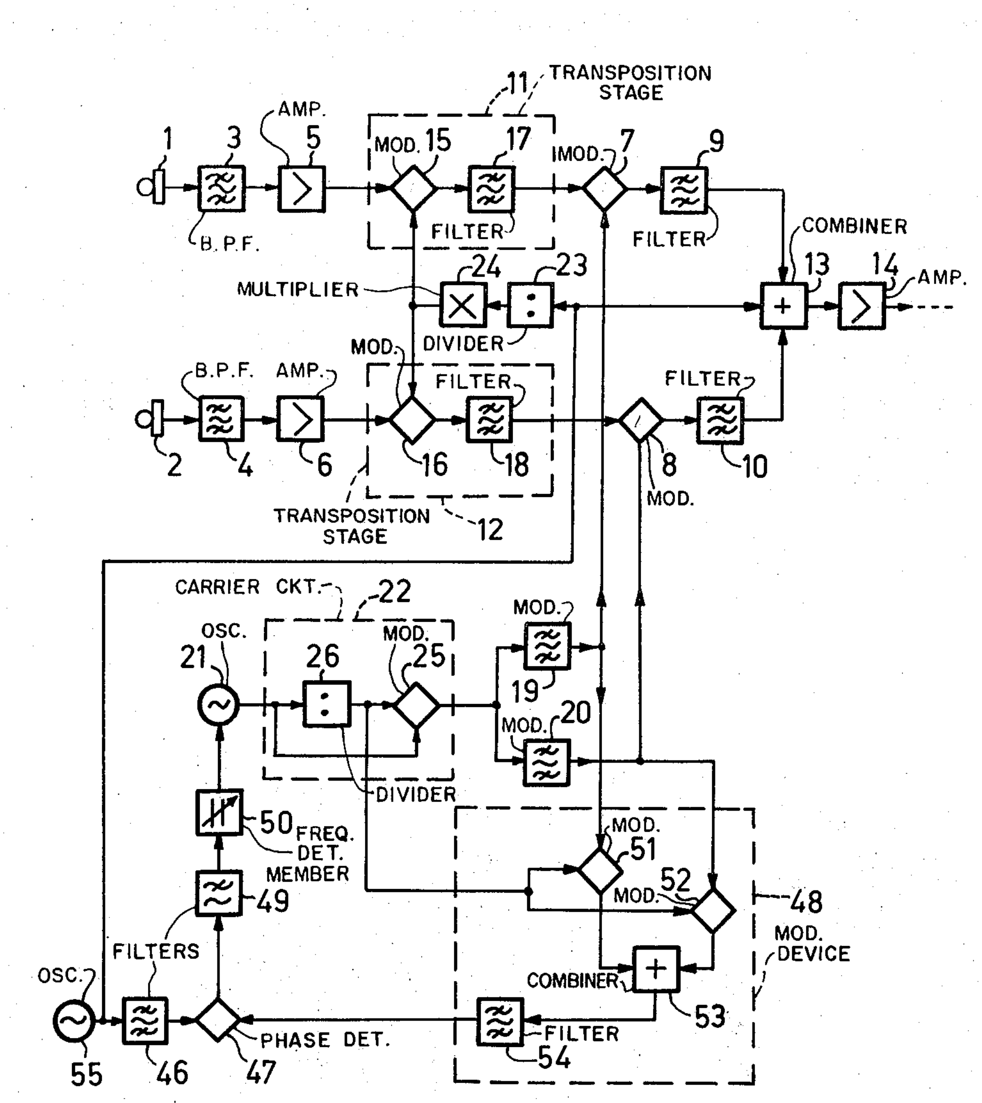
FIG. 1 shows a transmitter.
Figure 2:
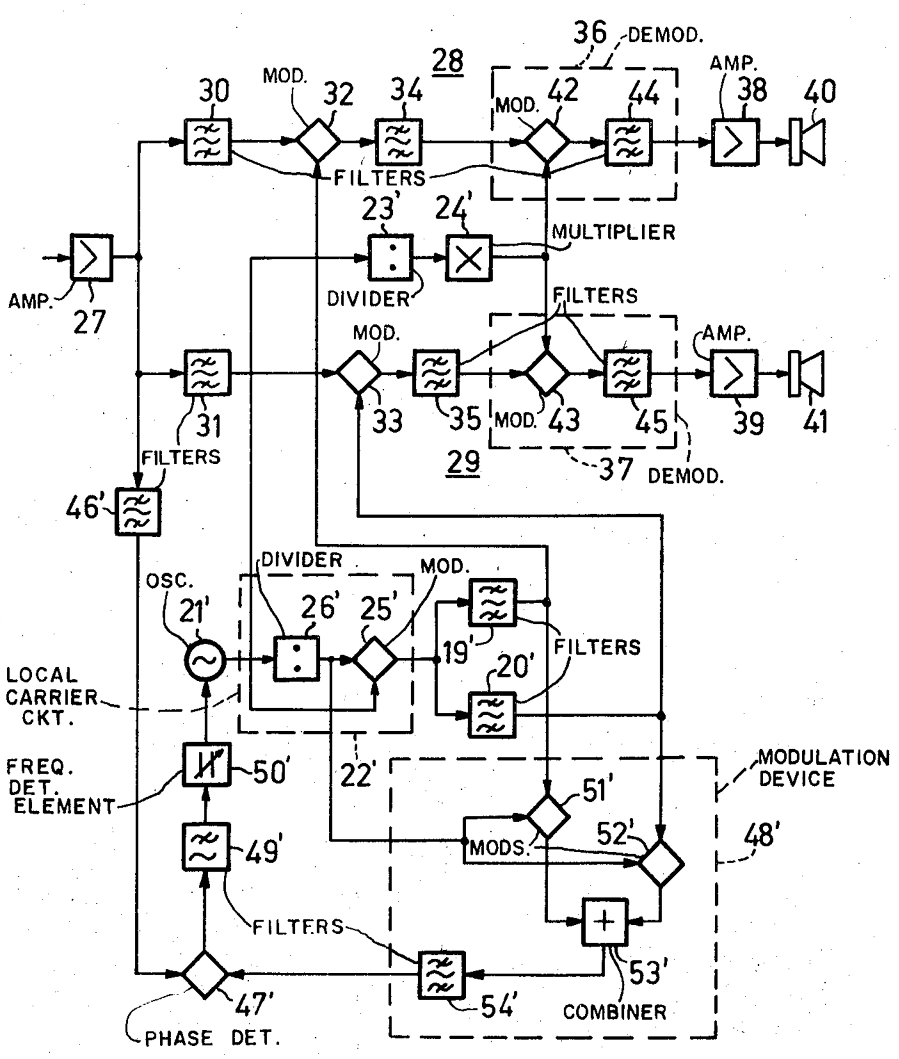
Figure 3A:
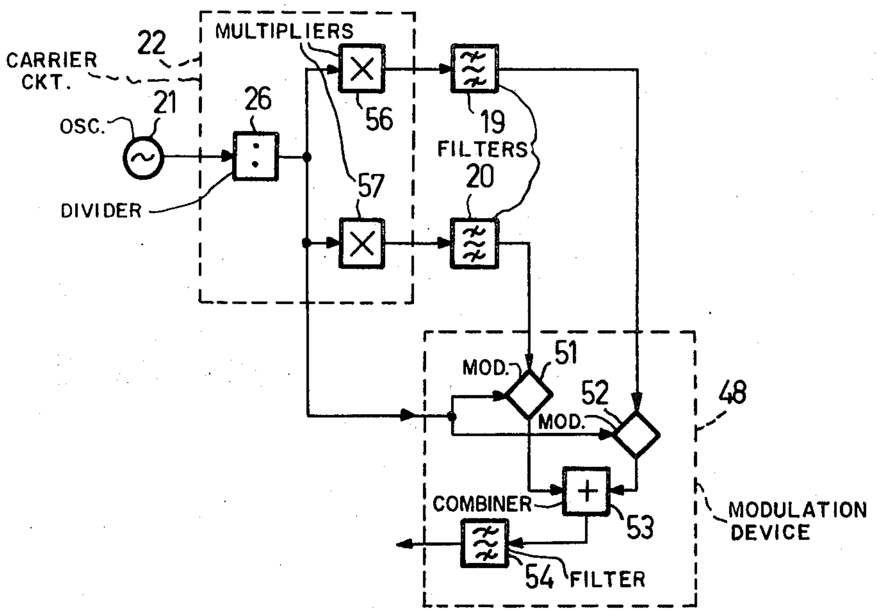
Figure 3B:
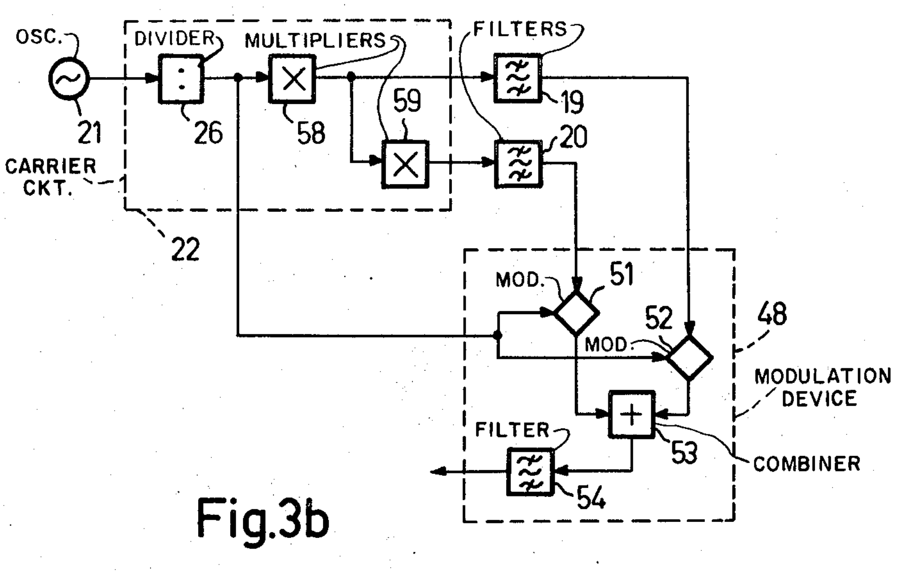

FIGS. 3*a* and 3*b* show modifications of the carrier circuits used in FIGS. 1 and 2.

FIG. 1 shows a transmitter for the transmission of two coherent stereophonic music signals in the frequency band of from 60 to 108 kHz in the base group of a carrier telephony system. In this transmitter the music signals originating from two microphones 1, 2 are applied through filters 3, 4 passing the music signals and having a pass band of from 0.03 to 15 kHz and low-frequency amplifiers 5, 6 to modulators 7, 8 and single sideband filters 9, 10 connected thereto, said modulators 7, 8 transposing the music signals to the frequency bands of from 65 to 79.97 kHz and 88.03 to 103 kHz while using transposition stages 11, 12. To this end the modulators 7, 8 are controlled by carrier signals of unequal frequency, namely 112 kHz and 56 kHz, respectively, while the single sideband filters 9, 10 select the lower sideband signal and the upper sideband signal from the output signals of the modulators 7, 8, which single sideband signals are transmitted together with a pilot signal after combination in a combination device 13 and after amplification in a transmitter amplifier 14.

In this embodiment the transposition stages 11, 12 are also constituted by modulators 15, 16 including single sideband filters 17, 18 connected thereto for selecting the upper sideband signal from the output signal from these modulators 15, 16 which are controlled by carrier signals of equal frequency, namely 32 kHz.

The carrier signals controlling the modulators 7, 8 and having frequencies of 112 and 56 kHz, respectively, are derived through selection circuits in the form of selection filters 19, 20 from a carrier circuit 22 controlled by a central generator 21 having a frequency of 84 kHz. A frequency corresponding to the frequency of 84 kHz of the central generator 21 is used as a pilot signal which is applied to the combination device 13 while the carrier signals of 32 kHz for the modulators 15, 16 are obtained from this frequency after frequency division by a factor of 21 by means of a frequency divider 23 and subsequent frequency multiplication by a factor of 8 by means of a frequency multiplier 24.

In the embodiment shown the carrier circuit 22 is provided with a modulator 25 to which the output signal from central generator 21 is applied on the one hand directly and on the other hand through a frequency divider 26 having a division factor of $n$=3. The selection filters 19, 20 then select the sum and difference signals having frequencies of 112 and 56 kHz, respectively, from the output signal from modulator 25, which sum and difference signals are applied as carrier signals to the modulators 7, 8.

In the cooperating receiver according to FIG. 2 in which the elements corresponding to those in the transmitter of FIG. 2 have the same reference numerals but are provided with indices, the received signals are applied after amplification in a receiver amplifier 27 to two parallel channels 28, 29 each including selection filters 30, 31 for selecting the signals in the signal bands of from 65 to 79.97 kHz and from 88.03 to 103 kHz, respectively, the signals thus selected being applied to modulators 32, 33 and single sideband filters 34–35 connected thereto. The modulators 32, 33 are controlled by carrier signals of unequal frequencies, namely 112 and 56 kHz, respectively, while the lower sideband signals are selected by the single sideband filters 34, 35, which signals are applied through single sideband demodulators 36, 37 and low-frequency amplifiers 38, 39 to reproducing devices 40, 41. Likewise as the frequency transposition stages 11, 12 in the transmitter, the stages 36, 37 operating as single sideband demodulators are constituted by modulators 42, 43 and output filters 44, 45 connected thereto which modulators 42, 43 are also controlled by carrier signals of equal frequency, namely 32 kHz.

The carrier signals of 112 and 56 kHz controlling the modulators 32, 33 are derived through selection circuits in the form of selection filters 19', 20' from a local carrier circuit 22' controlled by a local generator 21' which, likewise as carrier circuit 22 in the transmitter, is constituted by a modulator 25' to which the output signal from local generator 21' is applied on the one hand directly and on the other hand through a frequency divider 26', said generator 21' being synchronised on a frequency which is equal to that of the received pilot signal which is selected from the received signal by means of a selection filter 46'. The carrier signal of 32 kHz is derived from local generator 21' by means of frequency division by a factor of 21 with the aid of a frequency divider 23' and subsequent frequency multiplication by a factor of eight with the aid of a frequency multiplier 24'.

To realise an eminent transmission quality the phase difference between the two coherent stereophonic signals at the inputs of the reproducing devices 40, 41 is to be accurately equal to the phase difference of the two signals at the outputs of microphones 1,2.

Particularly detuning of the selection filters 19, 20, 19', 20' and 46' caused by temperature fluctuations in transmitter and receiver and by ageing phenomena and frequency shifts of several Herz in the transmission path introduce unequal phase shifts both in the transmitter and in the receiver in the carrier signals of 112 and 56 kHz, which phase shifts results in mutual phase shifts of the coherent stereophonic signals so that, as already mentioned, the transmission quality is influenced in a very disturbing manner. It is to be noted that modulators 15, 16 in the transmitter do not contribute to the mentioned unwanted phase shifts in the coherent stereophonic signals because the carrier signals for these two modulators are identical which is also the case for modulators 42, 43 in the receiver, while also the bandpass filters used in each channel do not introduce additional phase shifts in the two coherent signals as a result of their broad frequency bands.

In spite of the said unwanted phase shifts caused by detuning of the selective filters in the carrier circuits, their disturbing influence on the transmission quality of the coherent stereophonic signals in the transmission system is obviated in an elegant manner with simple equipment. More particularly the carrier circuit 22 and the generator 21 and selection circuits 19, 20 connected thereto in the transmitter are incorporated in an automatic phase correction loop (AFC-loop) provided with a phase detector 47 and a modulator 48 to which the carrier signals derived from the selection circuits 19, 20 are applied on the one hand and a modulation signal derived from carrier circuit 22 is applied on the other hand for generating an output signal whose frequency is equal to that of the generator signal, said output signal together with a control signal being applied to the phase detector 47 from whose output a control voltage is derived through a lowpass filter 49, which control voltage controls a frequency-determining member 50 of generator 21.

In the embodiment shown, in which generator 21 is tuned to a frequency of 84 kHz, modulator 48 is constituted by two modulators 51, 52 to which the output signals from selection circuits 19, 20 of 112 and 56 kHz, respectively, are applied through a first input and to which the output signal of 28 kHz from the frequency divider 26 having a division factor $n=3$ in the carrier circuit 22 is applied through a second input, the difference signal of 84 kHz obtained by modulation in modulator 51 and the sum signal of 84 kHz obtained at the output of modulator 52 being applied through a selection filter 54 to the phase detector 47 after combination in the combination device 53, which phase detector is also controlled by an oscillator 55 having a frequency of 84 kHz. Both modulators 51 and 52 have output signals of the same frequency, namely 84 kHz, but they have phase shifts which are dependent on the selection filters 19, 20. As a result the central oscillator 21 in the AFC-loop is exactly adjusted at the phase at which unwanted mutual phase shifts in the stereophonic signals are obviated by means of the method of single sideband transmission mentioned hereinbefore which will now be described in greater detail.

A fixed phase difference which in the mixer stage 47 functioning as a phase detector is, for example, $\pi/2$ rad. will be produced between the control signal from oscillator 55 applied to phase detector 47 and the output signal from selection filter 54 in the AFC-loop in case of a sufficiently large loop amplification and in the stabilised condition of central oscillator 21 and this means that the phase angle introduced by the phase shifts of generator 21, carrier circuit 22 and selection filters 19, 20 and 54 into the output signal from modulator 48 will have a phase shift of $\pi/2$ relative to oscillator 55. When the control signal from oscillator 55 is applied to phase detector 47 through a compensation filter 46, which is identical to selection filter 54, the influence of the phase shift of selection filter 54 on the said phase relation is compensated for so that the phase shift of $\pi/2$ relative to oscillator 55 is determined by the phase shifts of central oscillator 21, carrier circuit 22 and selection filters 19, 20.

Starting from the above-mentioned phase relations in the AFC-loop, the phase shift of central oscillator 21 as well as the carrier signal derived from selective filters 19, 20 can be mathematically deduced in a simple manner. When particularly the phase shifts of selection filters 46, 54 are given by $\phi_1$ and those of selection filters 19, 20 are given by $\phi_2$, $\phi_3$ and those of the carrier circuit, particularly of frequency divider 26, are given by $\phi_4$, the central generator 21 exhibits a phase shift of $-(\phi_2+\phi_3)/2 + \pi/2$ as a result of the action of the AFC-loop and the output signals from selection filters 19, 20 undergo phase shifts of $+\phi_s$ and $-\phi_s$ in which $\phi_s = \phi_2(1 - 1/n)/2 - \phi_3(1 + 1/n)/2 + \phi_4$.

Due to the action of the AFC-loop it has thus been achieved that the phase shifts of the carrier signals derived from selection filters 19, 20 are mutually equal in value but are opposite in direction while in addition for a variation $\Delta\phi$ of the value of the phase shift $\phi_2$ and/or $\phi_3$ of the selection filters 19, 20 a phase shift proportional to $\Delta\phi$ is introduced into each of the carrier signals, which additional phase shifts are also equal in value but opposite in direction for the two carrier signals.

It is achieved by the above-mentioned phase relation between the carrier signals derived from selection circuits 19, 20 for modulators 7, 8 that, as will now be described in greater detail, the disturbing phase shifts in the coherent signals introduced by the carrier circuit 22 and the selection filters 19, 20 connected thereto are prevented in the method of transmission of the two coherent signals as lower sideband and upper sideband signals. When it is assumed that the input signals to modulators 7, 8 functioning as modulating signals are represented by $A \cdot \cos(\omega_0 t + \phi_i)$ and $B \cdot \cos \omega_0 t$ and the two carrier signals applied to modulators 7, 8 are represented by $P \cdot \cos(\omega_1 t + \phi_s)$ and $Q \cdot \cos(\omega_2 t - \phi_s)$ the lower and upper sideband signals obtained at the outputs of single sideband filters 9, 10 are given by:

$$C \cdot \cos[(\omega_1 t + \phi_s) - (\omega_0 t + \phi_i)] \quad (1)$$

$$D \cdot \cos[(\omega_2 t - \phi_s) + (\omega_0 t)] \quad (2)$$

When the phase shifts $+Q_s$ and $-Q_s$ of the carrier signals represented by the first term between brackets in the argument of each cosine function are introduced into the modulating signals represented by the second term between brackets in the argument of each cosine function, the expressions (1) and (2) may be written as:

$$C \cdot \cos(\omega_1 t) - (\omega_0 t + \phi_i - \phi_s) \quad (3)$$

$$D \cdot \cos(\omega_2 t) + (\omega_0 t - \phi_s) \quad (4)$$

from which it is apparent that the phase shifts $+\phi_s$ and $-\phi_s$ which are equal in value but are opposite in direction in the carrier signals may be assumed to be resulting in an additional phase shift $-\phi_s$ of each of the modulating information signals. Thus the phase shifts caused by the different elements in the carrier circuit in the arrangement described are converted into one phase shift $-\phi_s$ of the modulating coherent signals.

By using the steps according to the invention it is achieved with the method of transmission of the two coherent signals at lower sideband and upper sideband signals that in spite of unequal phase shifts of the different elements used for carrier generation, particularly the phase shifts of selection filters 19, 20, the phase difference of the two transmitted stereophonic signals is not influenced so that an optimum transmission quality of the stereophonic signals is always ensured. Since furthermore variations in the different elements used for carrier generation such as detuning of the selection filters and the like neither cause any mutual phase shifts in the transmitted stereophonic signals, the additional important constructive advantage is obtained that no special requirements need be imposed on their construction and tolerances.

In the receiver shown in FIG. 2 the carrier is generated in the same manner as in the transmitter of FIG. 1 in which carrier signals of 112 and 56 kHz are also used. In the receiver shown the elements corresponding to those in FIG. 1 have the same reference numerals but are provided with indices.

Likewise as in the transmitter, the phase detector 47' is controlled by the control signal from control oscillator 55 in the transmitter which oscillator is directly connected to the combination device 13 in the output circuit of the transmitter and this received control signal is applied to phase detector 47' through pilot filter 46' which also operates as a compensation filter for filter 54' in the AFC-loop. The carrier signals of 112 and 56 kHz for the two modulators 32 and 33 are derived from selection filters 19' and 20', respectively.

Since the carrier generation in this receiver is effected in the same manner as in the transmitter, the two carrier signals do not introduce mutual phase shifts into the two output signals from the single sideband filters 34, 35, not even in case of a shift over several Herz of the pilot signal in the transmission path, for this shift becomes manifest in an additional phase shift of the control signal introduced by the pilot filter, which phase shift is compensated for by selection filter 54' in the AFC-loop. The phase difference between the two coherent signals is neither influenced by the single sideband demodulators 36, 37 because these demodulators, likewise as the frequency transposition stages in the transmitter, are controlled by identical carrier signals.

In case of transmission through the transmission path of the coherent stereophonic signals from the microphones 1, 2 to the reproducing devices 40, 41 in which one of the two coherent signals is transmitted as a lower sideband signal by single sideband modulation and one of the two coherent signals is transmitted as an upper sideband signal, it is thus achieved that the mutual phase difference between the two coherent signals remains unchanged so that an optimum transmission quality is always ensured even when transmitting over distances of 2,500 kms, which has also been found by experiment. Together with the constructive advantage that no special requirements need be imposed on construction and tolerances a transmission system for stereophonic signals which is very attractive in practice has been obtained by using the steps according to the invention.

FIG. 3*a* shows a modification of the carrier circuit 22 used in the transmitter according to FIG. 1 and the two selection filters 19, 20 connected thereto and it is different from the carrier circuit 22 according to FIG. 1 in that the modulator 25 is replaced by two frequency multipliers 56, 57 which are connected in parallel with the output of the frequency divider 26. To obtain the carrier signals of 112 and 56 kHz from the frequency of 84 kHz of generator 21 the multiplication factors of the frequency multipliers 56, 57 for a division factor $n=3$ of frequency divider 26 are given by $n+1 = 4$ and $n-1 = 2$, respectively.

A further embodiment of the carrier circuit 22 is shown in FIG. 3*b* and is different from the embodiment of FIG. 3*a* in that the two frequency multipliers 58, 59 are connected in series with the output of the frequency divider 26 in which case the multiplication factors are given by $n \pm 1$ and $(n \mp 1)/(n \pm 1)$, respectively.

It is to be noted that the two carrier circuits in the transmitter and the receiver may be mutually different without influencing the satisfactory operation of the transmission system in any way.

Furthermore it is to be noted that the frequency of the generators 21 and 21' used in the AFC-loop in transmitter and receiver, respectively, may deviate from the oscillator and pilot frequency of 84 kHz, which frequency is then derived from the generator frequency through division and/or multiplication.

What is claimed is:

1. A circuit for transmitting in a selected frequency band two coherent signals, said circuit comprising a pair of single sideband modulators each having an input means for receiving said signals respectively; a pair of means coupled to said modulators respectively for deriving an upper sideband signal from one of said modulators and a lower sideband from the other of said modulators; a central signal generator; means including a carrier signal circuit coupled to said generator and a pair selection filters coupled between said carrier circuit and said modulators respectively for applying to said modulators different frequency carrier signals; an automatic phase correction loop means including a modulation device means coupled to said selection filters and to said carrier circuit for producing a signal having a frequency equal to said central generator, a reference signal source, a phase detector means coupled to said reference source and to said modulation device for producing a control signal, a low pass filter coupled to said phase detector, and a frequency control means coupled to said low pass filter and said central generator for automatically correcting the frequency thereof; and means coupled to said deriving means and adapted to receive a pilot signal for transmitting said pilot and single sideband signals.

2. A circuit as claimed in claim 1 wherein said modulation device comprises first and second moddlators coupled to said selection filters respectively and to said modulation device, a combination device coupled to said first and second modulators, and a generator frequency selection filter coupled between said combination device and said phase detector.

3. A circuit as claimed in claim 1 wherein said carrier signal circuit comprises a frequency divider coupled to said central signal generator and to said modulation device, and a frequency transposer coupled to said divider.

4. A circuit as claimed in claim 3 wherein said transposer comprises a modulator having inputs coupled to said divider and said generator respectively, and an output parallel coupled to said selection filters.

5. A circuit as claimed in claim 2 further comprising a compensation filter having the same phase shift characteristic as said generator frequency selection filter coupled between said reference signal source and said phase detector.

6. A circuit as claimed in claim 1 further comprising means for utilizing said reference signal as said pilot signal comprising means for coupling said reference signal source to said transmitting means.

7. A circuit for receiving a composite signal having a pilot signal and two coherent single sideband signals of opposite sidebands and different carrier frequencies in a selected frequency band, said circuit comprising input means for receiving said composite signal and for separately supplying each of the component signals of said composite signal; a pair of single sideband demodulators coupled to said input means to receive said single sideband signals respectively; a local carrier signal circuit having a generator, a pair of selection circuit means coupled between said local carrier circuit and said demodulators respectively for applying different local carrier frequencies to said demodulators; and an automatic frequency and phase correction loop including a modulation device means coupled to said selection filters and to said local carrier circuit for producing a signal having a frequency equal to said generator, a phase detector coupled to said input means to receive said pilot signal and to said modulation device for producing a control signal, a low pass filter coupled to said phase detector, and a frequency control means coupled between said local generator and said low pass filter.

8. A circuit as claimed in claim 7 wherein said modulation device comprises first and second modulators coupled to said selection filters respectively and to said modulation device, a combination device coupled to said first and second modulators, and a generator frequency selection filter coupled between said combination device and said phase detector.

9. A circuit as claimed in claim 7 wherein said carrier signal circuit comprises a frequency divider coupled to said generator and to said modulation device, and a frequency transposer coupled to said divider.

10. A circuit as claimed in claim 9 wherein said transposer comprises a modulator having inputs coupled to said divider and said generator respectively, and an output parallel coupled to said selection filters.

11. A circuit as claimed in claim 8 further comprising a compensation filter having the same phase shift characteristic as said generator frequency selection filter coupled between said input means to receive pilot signal and said phase detector.

* * * * *

UNITED STATES PATENT AND TRADEMARK OFFICE
CERTIFICATE OF CORRECTION

PATENT NO. : 3,803,490
DATED : April 9, 1974
INVENTOR(S) : Petrus C. M. Almering et al It is certified that error appears in the above-identified patent and that said Letters Patent are hereby corrected as shown below:

IN THE CLAIMS

Claim 2, line 2, change "moddlators" to -- modulators --;

line 4, change "modulation device" to -- carrier signal circuit --;

Claim 8, line 4, change "modulation device" to -- carrier signal circuit --;

Signed and Sealed this

*sixth* Day of *April 1976*

[SEAL]

*Attest:*

RUTH C. MASON
*Attesting Officer*

C. MARSHALL DANN
*Commissioner of Patents and Trademarks*